United States Patent [19]
Myrent et al.

[11] 3,779,086
[45] Dec. 18, 1973

[54] COMBINED PULSE GENERATOR AND ODOMETER ASSEMBLY FOR A RAILWAY LOCOMOTIVE

[75] Inventors: Harry L. Myrent, Wilmette; Chester H. Fluder, Wheeling, both of Ill.

[73] Assignee: Vapor Corporation, Chicago, Ill.

[22] Filed: Oct. 11, 1972

[21] Appl. No.: 296,513

[52] U.S. Cl. .............................. 73/490, 235/95 R
[51] Int. Cl. ..................... G01c 23/00, G01c 22/00
[58] Field of Search .............................. 73/490, 493; 235/95 B, 95 R

[56] References Cited
FOREIGN PATENTS OR APPLICATIONS
| 698,937 | 10/1953 | Great Britain .................... 235/95 R |
| 698,869 | 10/1952 | Great Britain .................... 235/95 R |

Primary Examiner—James J. Gill
Attorney—Lloyd L. Zickert

[57] ABSTRACT

A combined rotary pulse generator and odometer assembly for the axle of a railway locomotive simultaneously generates a speed-indicative electrical signal and digitally totalizes mileage traveled. The assembly includes a pulse generator which has a shaft coupled to the end of a locomotive axle to develop electrical pulses as the axle turns. A novel odometer assembly, mounted on the cover plate of the pulse generator, converts the rotary motion of the generator shaft to oscillating motion to drive a digital mileage counter and record accumulated mileage for the locomotive. The odometer assembly is easily converted to accommodate different sizes of drive wheels and different units of distance, and the digital accumulated mileage display is positioned for maximum legibility under poor lighting conditions.

5 Claims, 6 Drawing Figures

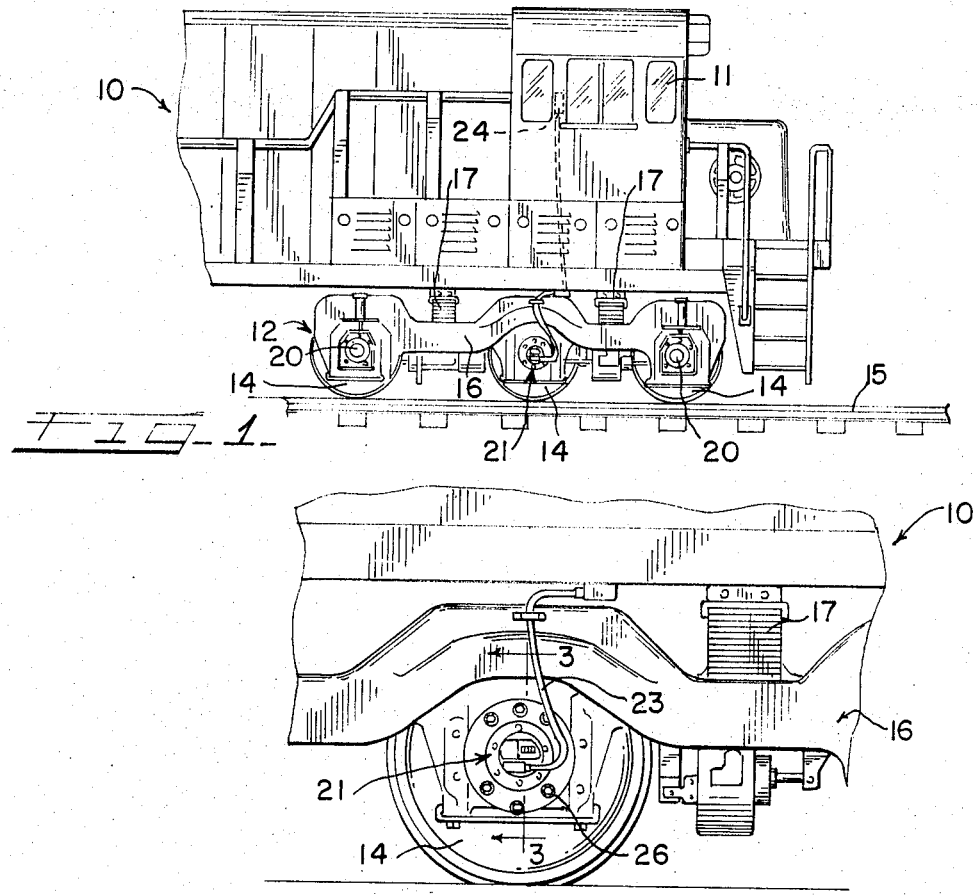
Fig. 1.
Fig. 2.
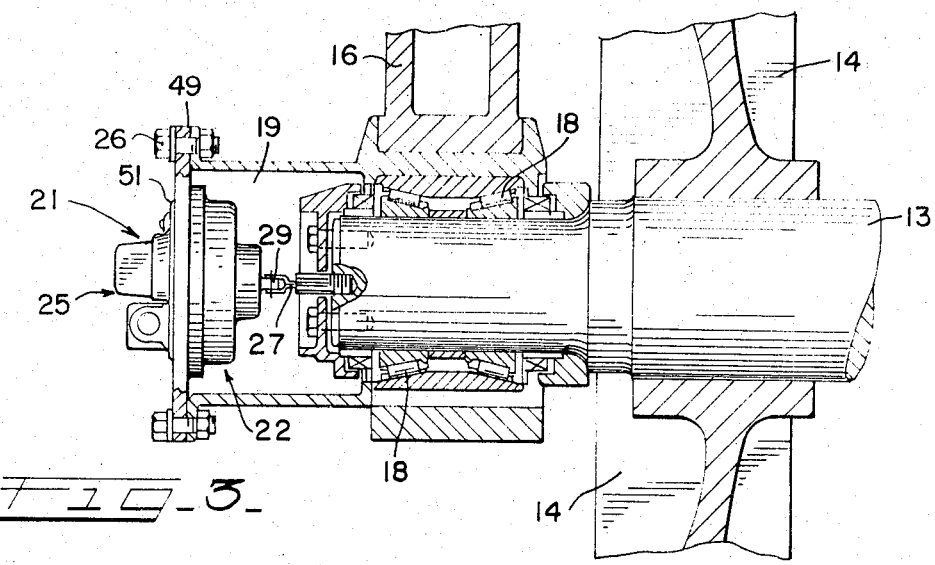
Fig. 3.

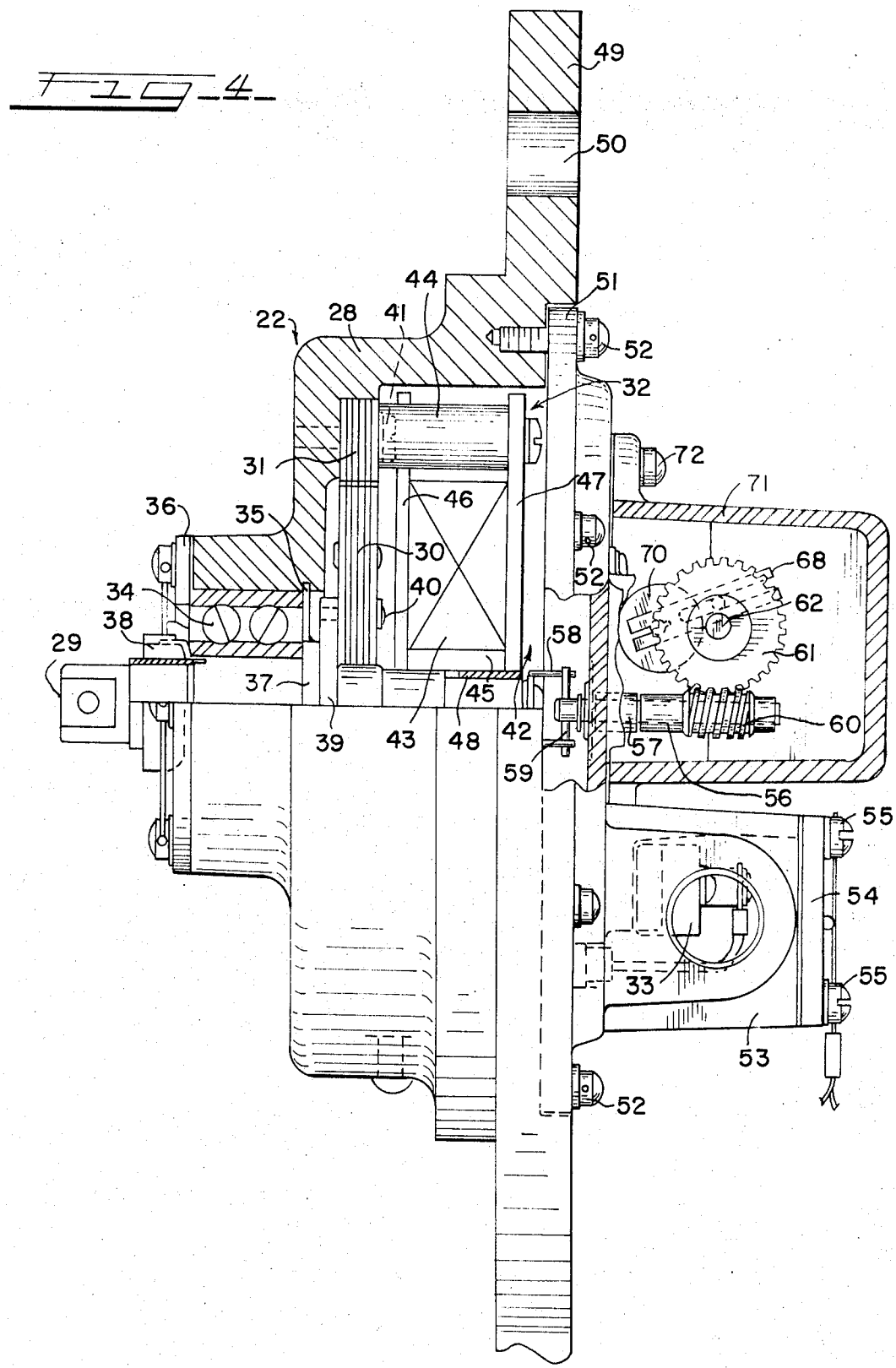

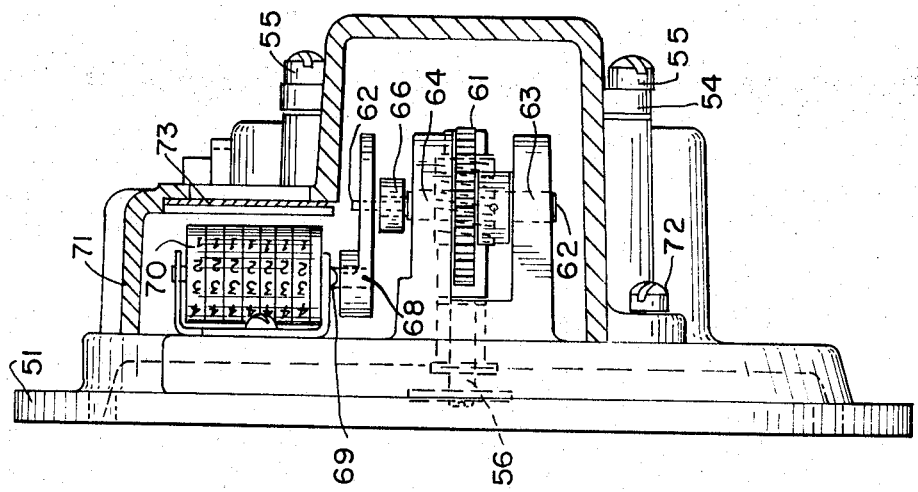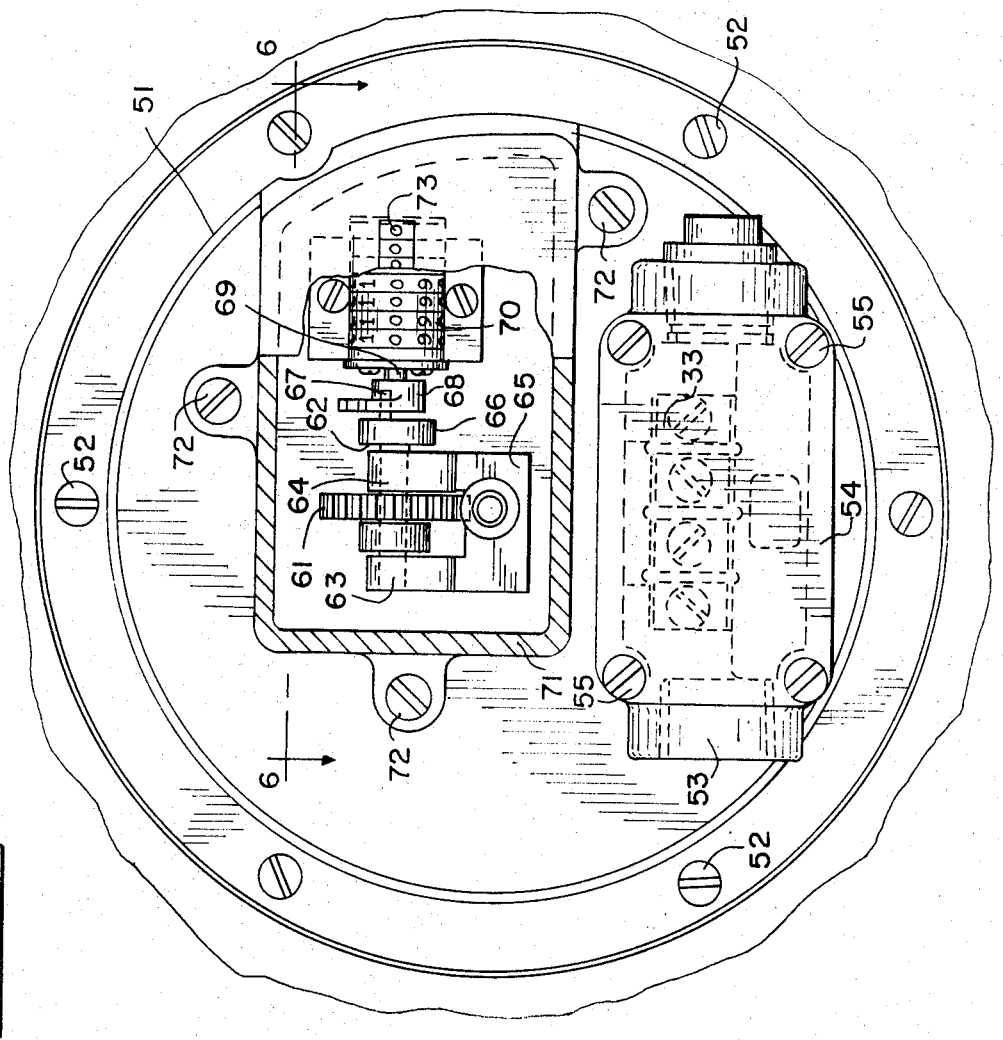

COMBINED PULSE GENERATOR AND ODOMETER ASSEMBLY FOR A RAILWAY LOCOMOTIVE

The present invention relates in general to odometers for railway vehicles, and more particularly to a combined pulse generator and odometer assembly for the axle of a railway locomotive.

In the operation of railway locomotives it is often desirable to know the actual distance a locomotive has traveled over a given period of time. This information can not only indicate the need for programmed preventative maintenance as the locomotive accumulates miles, but can also provide a valuable statistical input to maintenance and other operational records associated with the locomotive. To be most useful, this information should be available from outside of the locomotive, and should be presented in a form which is easily readable, even in the dimly lit environoment of a freight yard or train station.

It is also desirable in the operation of locomotives to know the rate of travel of the locomotive for obvious reasons of safety and efficiency of operation. To this end rate-of-travel indicators, either of the mechanical type wherein a flexible drive shaft is run from a pickup on the wheel to a mechanical speedometer in the cab, or of the electrical type, such as the Vapor Corporation SPEED-LOG, wherein a pulse generating pickup on the wheel drives an electrical indicator within the locomotive, have been provided on locomotives.

In either case, the functions of totalizing mileage and measuring speed have heretofore been accomplished by means of separate apparatus disposed on separate axle bearings of the locomotive. This has been necessary because prior-art odometers, including both axle-mounted and cab-type odometers, required a direct drive from the locomotive axle, precluding their concurrent use with a magnetic pulse generator or mechanical pickup on the same axle bearing. Unfortunately, this unnecessarily complicated repair work and added to the complexity and cost of manufacture of the locomotive.

The present invention is generally directed to a combined pulse generator-odometer assembly for installation on the journal box of a railway vehicle axle. The assembly generally comprises a rotary pulse generator for generating a speed signal, and an odometer for measuring distance traveled both forward and backward. The generator is coupled to and driven by the axle, and the odometer is coupled to an driven by the generator.

The assembly more specifcally comprises a rotary pulse generator having a body portion disposed within the journal box, a drive shaft rotatably coupled to the axle, and a cover plate adapted to mount on and enclose the body portion. The odometer includes a digital counter mounted on the cover plate having an input shaft responsive to oscillating motion for causing the counter to advance to higher counting states. An odometer drive shaft is provided extending through the generator cover plate and into rotational engagement with the pulse generator drive shaft, and a worm-drive gear is mounted on the odometer drive shaft. A worm-follower gear operatively engages the worm drive gear 60, and means responsive to the rotary motion of the worm-follower gear 61 are provided for oscillating the digital counter input shaft to periodically advance the counter while the locomotive is in motion.

Accordingly, it is a general object of the present invention to provide a combined pulse generator and odometer assembly for installation on the journal of a railway locomotive drive truck.

It is a more specific object of the present invention to provide a new and improved unitary pulse generator and distance recording odometer for a railway locomotive which is rugged, completely enclosed and which presents a narrow profile so as to not interfere with operation of the locomotive.

It is still another specific object of the present invention to provide a new and improved odometer for the axle of a railway locomotive which provides a digital presentation of total mileage which can be read from outside the locomotive under poor ambient light conditions.

Other objects, features and advantages of the invention will be apparent from the following detailed disclosure, taken in conjunction with the accompanying sheets of drawings, wherein like reference numerals refer to like parts, in which:

FIG. 1 is a side view of the front portion of a railway locomotive having a drive truck which incorporates a combined pulse generator and odometer assembly constructed in accordance with the present invention.

FIG. 2 is a front view of the drive wheel and journal box of the drive truck of FIG. 1 on which the combined pulse generator and odometer assembly of the present invention is installed.

FIG. 3 is a fragmentary cross-sectional side view of the drive wheel and journal box of FIG. 2 showing the combined pulse generator and odometer of the present invention.

FIG. 4 is a side view, partially in section, of a combined pulse generator and odometer assembly constructed in accordance with the invention.

FIG. 5 is a front elevational view, partially in section, of a combined pulse generator and odometer assembly constructed in accordance with the invention.

FIG. 6 is a cross-sectional view taken along lines 6—6 of FIG. 5.

Referring to FIGS. 1-3, a combined pulse generator and odometer assembly is shown installed on the front axle of a railway locomotive 10. The locomotive may be conventional in design and construction, having a cab compartment 11 and one or more drive trucks 12. The drive trucks may also be of conventional design and construction, having a trio of axles 13, each carrying a flanged drive wheel 14 on either end for engagement with a rail 15. The axles are held in spaced-apart relationship above the rail by a truck carriage 16 which supports the locomotive body through a plurality of spring members 17.

The axles 13 are rotatably supported by journal bearings 18 mounted in the truck carriage 16. The wheels 14 are carried on the axles inside of and adjacent the journal bearings. The carriage is extended in front of each journal bearing to form a journal box 19, which may be packed with grease or other lubricant, and which is normally covered with a journal cover plate 20 to retain its grease packing and prevent dust and dirt from entering.

In accordance with the invention, the center wheel of the front right drive truck of the locomotive is fitted with a combined pulse generator and odometer assembly 21. This novel assembly produces speed-indicative electrical output pulses as the locomotive moves, while simultaneously recording total mileage. The speed-indicative pulses are generated in a rotary pulse generator portion 22 of the assembly, and applied by means of a conductor 23 to a speed indicator 24, which may be mounted in view of the operator in cab 11. Totalized mileage is recorded by means of a digital odometer portion 25 of the assembly, which is illustrated in detail in FIG. 4.

The combined pulse generator and odometer assembly 21 is secured to the front of journal box 19 by means of a plurality of nut and bolt assemblies or fasteners 26, the journal box cover 20 being first removed and the back plate of the combined assembly being mounted in its place. It is also necessary to mechanically couple axle 13 to the combined assembly 21. This may be conveniently accomplished by providing a flexible coupling member 27 between the input shaft of the pulse generator and the end of the axle. While the coupling can be attached to the axle by any convenient means, it has been found convenient to utilize a threaded spline attachment to the end of the axle, since this arragnement is readily installed in the field and permits assembly 21 to be readily removed for repair or replacement.

Reference is now made to FIG. 4, which shows the combined pulse generator and odometer assembly 21 of the invention in partial cross-section. There, the pulse generator portion 22 of the assembly is seen to generally comprise housing 28 which rotatably supports a rotor shaft 29 having a rotor 30 mounted thereon, a stator 31 which is fixed in the housing in co-acting relation to the rotor 30, and a coil assembly 32 which responds to the changing flux density of a magnetic field generated and produces an electrical output signal. The rotor shaft, rotor and stator are of magnetic material. This signal is applied to a terminal strip 33, from which it is carried by conductor 23 to the locomotive speed indicating apparatus. As we have previously seen, the rotor shaft 29 is coupled directly to the axle 13 of the locomotive by coupling 27.

The housing 28 includes a hub portion having a bearing 34 for supporting rotor shaft 29. The bearing is maintained in position by a retaining ring 35 at one end and a cover plate 36 at the other end. A shoulder 37 is formed on the rotor shaft to cooperate with a lock nut 38 threaded on the shaft to lock the shaft to the inner race of the bearing 34. The outer free end of the rotor shaft 29 is preferably flattened or otherwise formed to facilitate coupling it to the locomotive axle.

Both the rotor 30 and the stator 31 are formed by securing a plurality of laminations together by riveting or other suitable means. The rotor is secured to a flange 39 on the rotor shaft by a plurality of fasteners 40 and the stator is secured to housing 28 by a plurality of fasteners 41. The exterior edge or periphery of the laminated rotor and the inner periphery of the stator are formed to define a plurality of circumferentially spaced teeth. These teeth are of equal spacing and equal number, and are arranged in radial alignment so they will match and mismatch as the axle revolves.

Coil assembly 32 responds to the periodic changes in magnetic field intensity as the magnetic circuit is periodically established and interrupted to generate an electrical signal for the speed indicating equipment. The coil assembly includes a bobbin 42, a coil winding 43, and a plurality of permanent magnets 44. The bobbin 42 is constructed of a magnetic core 45, a circular non-magnetic electrically conductive front plate 46, and a circular magnetic back plate 47.

The permanent magnets 44 are cylindrical in shape and abut at one end the magnetic back plate 47, and extend through openings formed in the front plate 46 to bear against one side of the stator 31. The rear end of the rotor shaft 29 extends through the coil assembly, and to further support the end of the rotor shaft associated with the coil assembly, a sleeve bearing 48 is mounted under the bobbin 42. A mounting flang 49 is formed integrally with the annular wall of the housing 28 and is provided with a plurality of holes 50 to receive fasteners 26 and to facilitate mounting the generator to a locomotive journal box. Housing 28 is closed at its rear end by a generator cover member 51 which is secured thereto by a plurality of machine bolts 52. Cover member 51 includes on its outer surface an integrally formed junction box 53 within which is mounted terminal strip 33. An access plate 54 secured by a plurality of wire-locked machine screws 55 permits access to the terminal strip box.

In operation, an output signal is obtained from the generator when the locomotive axle causes rotor shaft 29 and rotor 30 to rotate. The permanent magnets 44 produce a magnetic filed which loops through the stator 31, the rotor 30, the rotor shaft 29 and the back plate 47 of the coil assembly. Matching and mismatching of the teeth on the rotor and stator change the flux density of this magnetic filed and generate a current in winding 43, the frequency of which depends on the number of teeth on the stator and rotor. The non-magnetic front plate 46 acts as a shorted turn to limit the peak-to-peak output voltage, which could otherwise cause damage to the input stages in the electronic speed display instruments associated with the pulse generator.

In accordance with the invention, the combined pulse generator and odometer of the present invention includes a novel digital mileage totalizing assembly, as seen in cross-section in FIG. 4. Basically, this mechanism comprises an odometer drive shaft 56 rotatably mounted in a sleeve bearing 57 carried by the generator cover plate 51. The shaft 56 extends through the cover plate, and is coaxial with and rotationally coupled to the generator drive shaft by means of a fork member 58 carried on the generator shaft and a cooperating clevis member 59 disposed on the end of the odometer drive shaft. This effectively couples the two shafts but yet allows them to be separated should it become necessary to remove mounting plate 51 for maintenance of the pulse generator.

A worm-drive gear 60 is mounted near the end of shaft 56. This gear meshes with a worm-follower gear 61, which, referring to FIGS. 5 and 6, is mounted on a shaft 62 between two spaced-apart sleeve bearings 63 and 64, which comprise part of a unitary shaft support assembly 65. The rotary motion of shaft 62 is converted to oscillating motion by means of a slot-crank type geneva movement. This movement comprises a wheel 66 mounted on the end of shaft 62 adjacent bearing 64. An eccentric pin 67, mounted off-center on the wheel 66 engages a slot on one end of a crank arm 68, the other end of which is fixed to the input shaft 69 of a digital counter or odometer assembly 70.

In operation, as the locomotive moves odometer drive shaft 56 rotates, causing worm-drive gear 60 to drive worm-follower gear 61 at a reduced speed, typically with a net reduction of approximately 50:1 for mileage indications and 30:1 for kilometer indications. The exact ratio between the two speeds is dependent on the ratio between gears 60 and 61 and is selected to provide an accurate mileage indication on the particular counter used. As worm-follower gear 61 rotates, it rotates shaft 62 which causes wheel 66 to rotate. This causes crank arm 68 to oscillate about its pivot point on shaft 69 as its slotted end follows pin 67, imparting an oscillating motion to the shaft. Digital counter 70 responds to this input by advancing its count one step or one-tenth division for each oscillation. Thus, the counter advances one mile for each 500 revolutions of the locomotive drive axle, or one kilometer for each 300 revolutions of the drive axle.

Counter 70 may be entirely conventional in design and operation, and therefore need not be shown in further detail. It suffices in this particular embodiment of the invention that counter 70 responds by counting in one-tenth units to oscillating motion applied to its input shaft, in contrast to those counters responding to full revolutions. A cover 71 is mounted on cover plate 51 by a plurality of machine screws 72 to provide a weather-tight protective covering for the odometer assembly. This cover may contain a window 73 through which the digits of counter 70 can be conveniently viewed, and an enlarged portion for accomodating the gears and geneva assembly of the odometer mechanism.

The use of the aforedescribed gear arrangement for driving counter 70 is particularly attractive because of the low profile it provides on the outside of the journal box, while permitting the digits of the counter to be readily viewed, even in dimly-lit yard and terminal areas. The odometer assembly can be made to readily accommodate various units of measurement and wheel sizes by merely changing worm-drive gear 60 and worm-follower gear 61, which are readily accessible by removing cover 71. Furthermore, this gear arrangement provides increased reliability since the counter and the reduction gears are not required to operate at high axle speeds.

Thus, a novel axle-mounted assembly has been shown for a railway locomotive which produces pulses at a rate dependent on the speed of the locomotive, while at the same time totatlizing mileage traveled. It does this with only one connection to the axle of the locomotive for ease of installation and maintenance. The assembly presents a minimum profile above the journal box so as not to interfere with normal operation of the locomotive, and is easily adapted to differnent types of locomotives and distance units, e.g. miles or kilometers, by merely changing two gears.

It will be understood that modications and variations may be effected without departing from the scope of the novel concepts of the present invention, but it is understood that this application is to be limited only by the scope of the appended claims.

This invention is hereby claimed as follows:

1. A combined pulse generator-odometer assembly for installation on the journal box of a railway vehicle axle, comprising a rotary pulse generator and an odometer:

said rotary pulse generator having a body portion adapted to be mounted within said journal box, a drive shaft rotatably coupled to said axle, and a cover plate adapted to mount on and enclose said body portion;

said odometer including a digital counter mounted on said cover plate and having an input shaft responsive to oscillating motion for causing the counter to advance to high counting states;

an odometer drive shaft extending through said generator cover plate and into rotational engagement with said pulse generator drive shaft;

a worm-drive gear mounted on said odometer drive shaft;

a worm-follower gear operatively engaged with said worm-drive gear; and means responsive to the rotation of said worm-follower gear for oscillating said digital counter input shaft to periodically advance said counter while said locomotive is in motion.

2. A combine pulse generator-odometer assembly as defined in claim 1 wherein said means for oscillating said digital counter shaft comprises a slot-crank geneva movement.

3. A combined pulse generator-odometer assembly as defined in claim 2 wherein said slot-crank geneva movement comprises a wheel, a pin mounted off-center on said wheel, and a crank arm having one end coupled to said odometer input shaft and having a slot at the other end slidably receiving said pin.

4. A combined pulse generator-odometer assembly as defined in claim 3 wherein said odometer input shaft is disposed parallel to the plane of said cover plate and at right angles to said odometer drive shaft.

5. A combined pulse generator-odometer assembly as defined in claim 1 wherein said odometer drive shaft is coupled to said generator drive shaft by means of a fork and clevis assembly.

* * * * *